(12) United States Patent
Kaminski et al.

(10) Patent No.: US 11,527,037 B2
(45) Date of Patent: Dec. 13, 2022

(54) POSITION-BASED MEDIA PIPELINE FOR VOLUMETRIC DISPLAYS

(71) Applicant: MSG Entertainment Group, LLC, New York, NY (US)

(72) Inventors: Kurt Kaminski, Oakland, CA (US); Landon Thomas Humphreys, Oakland, CA (US)

(73) Assignee: MSG Entertainment Group, LLC, New York, NY (US)

( * ) Notice: Subject to any disclaimer, the term of this patent is extended or adjusted under 35 U.S.C. 154(b) by 0 days.

(21) Appl. No.: 17/390,443

(22) Filed: Jul. 30, 2021

(65) Prior Publication Data

US 2021/0358199 A1 Nov. 18, 2021

Related U.S. Application Data

(63) Continuation of application No. 16/723,740, filed on Dec. 20, 2019, now Pat. No. 11,080,923.

(60) Provisional application No. 62/946,831, filed on Dec. 11, 2019.

(51) Int. Cl.
*G06T 15/08* (2011.01)
*G06T 13/40* (2011.01)
*G06T 15/04* (2011.01)

(52) U.S. Cl.
CPC .............. *G06T 15/08* (2013.01); *G06T 13/40* (2013.01); *G06T 15/04* (2013.01)

(58) Field of Classification Search
CPC .................. G06T 15/08; G06T 13/40
See application file for complete search history.

(56) References Cited

U.S. PATENT DOCUMENTS

| 5,801,666 A | * | 9/1998 | MacFarlane | ............ | G09F 19/12 |
| | | | | | 348/E13.059 |
| 2009/0303313 A1 | * | 12/2009 | Yukich | ................ | H04N 13/393 |
| | | | | | 348/51 |
| 2018/0268570 A1 | | 9/2018 | Budagavi et al. | | |

OTHER PUBLICATIONS

Stephen DiVerdi, Ismo Rakkolainen, Tobias Höllerer, Alex Olwal, "A novel walk-through 3D display," Proc. SPIE 6055, Stereoscopic Displays and Virtual Reality Systems XIII, 605519 (Jan. 30, 2006) (Year: 2006).*

Notification of Transmittal of the International Search Report and the Written Opinion of the International Searching Authority, for International Appl. No. PCT/US20/64589, filed Dec. 11, 2020, 14 pages, dated Mar. 22, 2021.

(Continued)

*Primary Examiner* — Shivang I Patel
(74) *Attorney, Agent, or Firm* — Sterne, Kessler, Goldstein & Fox P.L.L.C.

(57) ABSTRACT

Position based media pipeline systems and methods for volumetric displays provide content to a volumetric display having at least two pixels arranged in a 3D coordinate space. A three-dimensional (3D) pixel position dataset and a 3D animation are provided and a first volume representation based on the 3D animation is created. A second volume is created based on the first volume and including color data. A texture atlas is assembled based on the second volume and volumetric image data is generated based on the texture atlas. The position based media pipeline outputs the volumetric image data to one or more graphic controllers. The volumetric image data can be output whereby a user can preview the volumetric image data in addition to output to the volumetric display.

20 Claims, 11 Drawing Sheets

(56) References Cited

OTHER PUBLICATIONS

Ikits et al. "Chapter 39. Volume Rendering Techniques", in GPU Gems [online], pp. 1-22, published Sep. 2007 [retrieved on Feb. 12, 2021], Retrieved from the Internet <URL: https //developer.download.nvidia.com/books/HTML/gpugems/gpugems_ch39.html>entire document.

Favalora et al. "100 Million-voxel volumetric display", in Society of Photo-Optical Instrumentation Engineers (online], pp. 1-13, published Apr. 2002 [retrieved on Feb. 12, 2021]. Retrieved from the Internet <URL:https://citeseerx.ist.psu.edu/viewdoc/download?doi=10.1.1.11.9088&rep=repl&type=pdf>entire document.

Stephen DiVerdi, lsmo Rakkolainen, Tobias Hbllerer, Alex Olwal, "A novel walkthrough 3D display," Proc. SPIE 6055, Stereoscopic Displays and Virtual Reality Systems XIII, 605519 (Jan. 30, 2006); (Year: 2006).

\* cited by examiner

POSITION-BASED MEDIA PIPELINE FOR VOLUMETRIC DISPLAYS

CROSS-REFERENCE TO RELATED APPLICATION

The present application is a continuation of U.S. patent application Ser. No. 16/723,740, filed Dec. 20, 2019, which claims the benefit of U.S. Provisional Patent Appl. No. 62/946,831, filed Dec. 11, 2019, each of which is incorporated herein by reference in its entirety.

BACKGROUND

Three-dimensional (3D) animation generally represents geometry without consideration for the volume of that geometry. Only geometry that reflects light in a scene is rendered onto a two-dimensional (2D) screen. That is, only surfaces are considered. This complicates the rendering of many effects, including smoke, liquids, and destruction. Solutions are required that consider not just the surface, but also the interior of a 3D geometry.

A user, such as an artist, lacking this solution, is then required to address the volumetric display in a sub-optimal mapping, such as a 2D projection or utilizing a painstaking manual technique with minimal quality control and a high chance for inaccuracies or discrepancies with their original animation.

FIELD OF THE DISCLOSURE

This application relates generally to displaying content in a volumetric display, and more specifically but not limited to displaying 3D content rendered in 3D to a volumetric display and rendered in 2D to a visualization display.

BRIEF SUMMARY OF THE DISCLOSURE

A position-based media pipeline for volumetric displays (PBMP) includes systems and methods to generate content for a volumetric display, for example, a volumetric Light-Emitting Diode (LED) display. The volumetric display can be a true 3D field of pixels that fills a volume of space. The PBMP enables users (such as artists, developers, artists, designers, engineers, producers, etc.) to generate, compare and visualize different LED densities for a target volumetric display. The PBMP enables users to deliver 3D volumetric representations of animation instead of 3D projections onto 2D images.

Embodiments described herein include methods for visualizing 3D media on a 3D volume, such as an LED wall. Some embodiments provide uniform output to a volumetric display and a visualization display. Volumetric displays, including 3D volumes, can have complicated arrangement and provide complexities compared to a 2D image signal. Visualization of the target volumetric display and image enables a user to preview the image, such as a 3D animation volume, in the environment of the target volumetric display.

Some embodiments described herein include a visualization process that includes importing point cloud position data to represent visualization of a volumetric display. In some embodiments, LED products included in a target volumetric display are modeled to scale. In some embodiments, a texture atlas is generated based on a animation and a parameter specifying a number of slices to be implemented in the texture map. The number of slices can be set by a user or by an automated process. In some embodiments, the point cloud position data is UV-mapped to specify points in a 2D space that to a 3D object. In some embodiments, when a texture atlas is generated, a UV map associates a spot on the target volumetric display to the texture atlas. Thereby, with known pixel position data, a point cloud and texture atlas can be suitably generated.

In some embodiments, a method includes receiving a 3D pixel position dataset and a 3D animation, creating a volume representation based on the 3D animation, creating a color data volume by adding color data to the volume representation, producing a texture atlas by sampling the color data volume. In some embodiments, volumetric image data is generated based on the texture atlas and output. In some embodiments, the volumetric image data is output to a visualization display, a volumetric display on which the 3D pixel position dataset is based, and/or a combination of both.

In some embodiments, the volumetric image data is produced with a 3D texture from the texture atlas and a pixel map is generated with normalized positions of the pixel position dataset. The normalized positions of the pixel position dataset correspond to a coordinate space of one or more volumetric displays.

In some embodiments, a user can preview the volumetric image data by the volumetric image data output to a visualization display. In some embodiments, the pixel map is generated by translating the 3D coordinate space of a volumetric display to a 2D coordinate space, for example, by a UV-mapping process.

BRIEF DESCRIPTION OF THE DRAWINGS/FIGURES

DETAILED DESCRIPTION OF THE DISCLOSURE

Position-Based Media Pipeline Methods for Volumetric Displays

Figure 1:
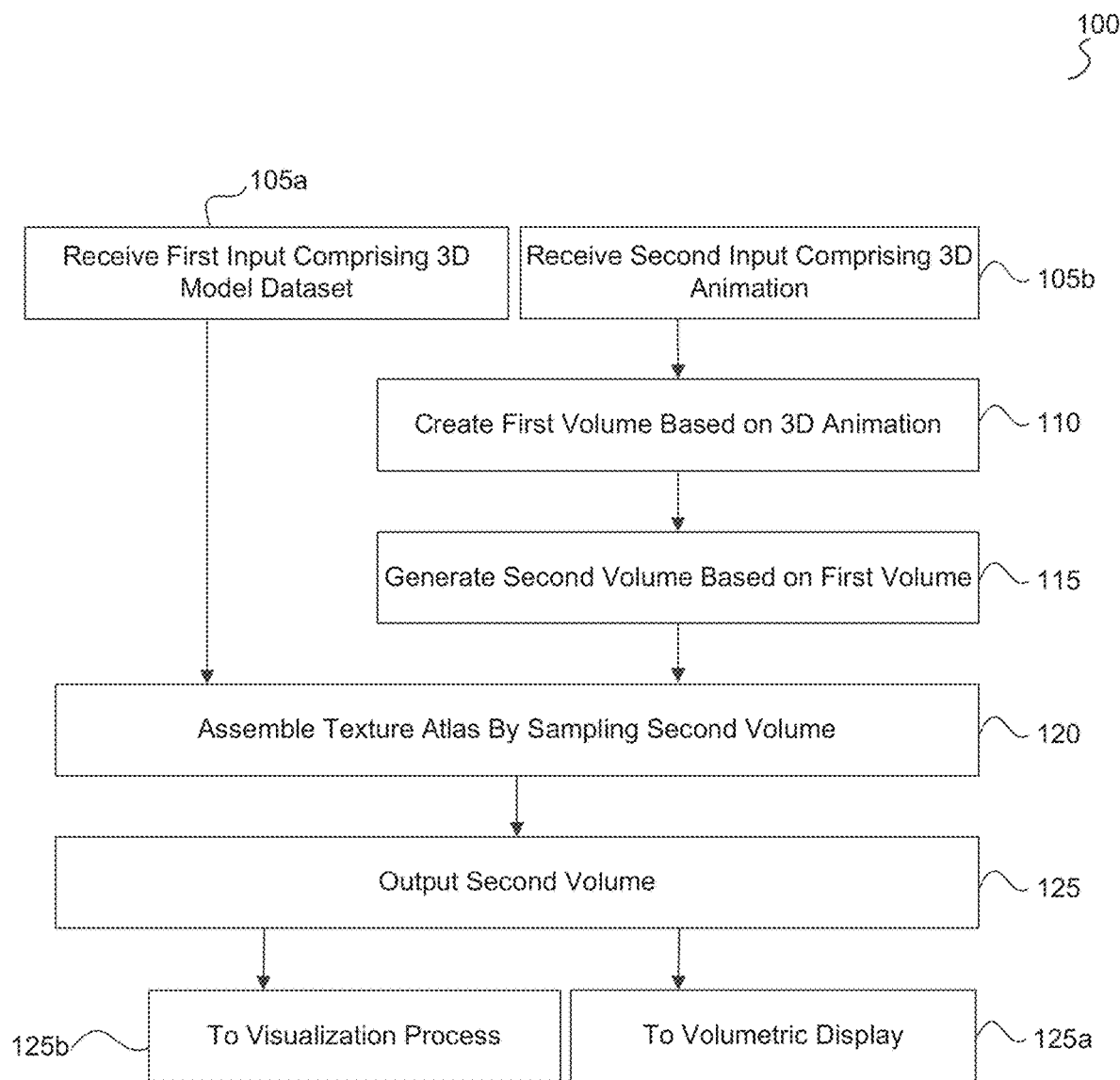
FIG. 1 is a flow diagram of a position-based media pipeline and method for volumetric displays, according to some embodiments.

FIG. 1 illustrates a position-based media pipeline method to render 3D animation for volumetric displays, according to some embodiments. The position-based media pipeline method addresses the inability of conventional animation processes to provide content for volumetric displays. A volumetric display can have a cuboid shape and either come with rudimentary custom software from the hardware vendor, or are addressed with custom software from the installation team using mathematical functions.

Referring to FIG. 1, position-based media pipeline method 100 provides a unified framework for creating and outputting volumetric media to volumetric displays, for example, non-rectangular custom display shapes. Position-based media pipeline method 100 is a position-based workflow that enables users to animate 3D geometry to the exact scale and position of the volumetric display.

Further, the volumetric display is not limited to rectangular shapes, and can have pixels that exist anywhere in space, in any orientation. For example, imagine a chandelier of suspended LEDs in a complex arrangement. There is no turnkey solution for addressing this kind of display in a spatially cohesive way. Our approach gives artists the freedom to imagine the best kind of content for this display arrangement with full confidence that their media will be faithfully represented without distortion or the need for special treatment. From here, one might imagine any configuration of LEDs, in a dense or sparse pattern, that could be treated in the exact same way.

At operation 105a, the position-based media pipeline is operated by a user to create or acquire a 3D model dataset of all pixel positions of a target volumetric display. In some embodiments, the exact position of the LEDs of the volumetric display are included in the input to improve accuracy with respect to scale and timing of the pixel positions. In some embodiments, operation 105a includes a process of acquiring a point cloud that includes information about every pixel to be in included in the volumetric display. This can be done by modeling or sensing the position data to obtain each height, width, and depth coordinate (X,Y,Z) of a given pixel in the volumetric display. In other embodiments, operation 105a includes input by a user of a 3D model dataset. For example, a point cloud having the structure of (pixel, X,Y,Z) may include data as follows: "1, 12, 12, 94" to represent a first pixel where X is 12, Y is 12 and Z is 94.

At operation 105b, the user can create movement (e.g., a human walking) using a 3D animation tool. In one example, the user generates the 3D animation and imports it into the position-based media pipeline. For example, the user can create a 3D animation using a vertex/polygon model. In some embodiments, a user can base the 3D animation on the point cloud provided in operation 105a. In one example, the 3D geometry and any associated effects (e.g., smoke, liquids, destruction) may be first animated relative to the pixel positions.

At operation 110, the 3D animated content is converted to a volumetric representation. After the 3D model dataset is acquired and converted to a volume. This volume representation creates a continuous density gradient parameter. The density gradient of the 3D model dataset ranges from zero on the outermost point on the shell to one at the innermost point. The density gradient provides a basis for manipulating different properties of the volume. Several non-limiting examples of the properties that can be manipulated according to the density gradient include opacity, color, internal structure, apparent softness, and any other aesthetic element. The volume resolution is provided in voxel size. Generally, the voxel is inversely related to the density gradient resolution. That is, the smaller the voxel, the higher the resolution of the density gradient.

At operation 115, content can be added to the density gradient of the volume. The density gradient provides a function to allow information to be entered about the continuous space that is enclosed within this geometric volume. In one embodiment, the volume representation is provided in the form of a population of spheres. Operation 115 then enables a user to provide information about the continuous interior space enclosed within each sphere.

In one embodiment, operation 115 provides a function to add color content to the density gradient of the volume. This color content can be added to the volume in various ways. In one embodiment, the color content can be input or interpreted into the volume from a texture map. In another embodiment, the color field can be based on the density gradient. In additional embodiments, a complex custom effect can be developed to colorize the volume.

In other embodiments, operation 115 provides a function to add information about the exterior boundary of the geometric volume. In a non-limiting example, a user can add information about whether the exterior boundary of a volume is soft (i.e., fuzzy) or has a sharp edge. In additional embodiments, a user can enter any parameter about the interior of each respective volume. Operation 115 thereby provides control over the creation of the entire volume, not just the 2D outer shell.

At operation 120, an automated process progressively samples the volumetric representation along its depth to create slices. The slices are then imported in a texture atlas. To enhance the reliability of playback, the continuous color and density fields are discretized and stored. In some embodiments, the discrete slices are stored in the form of images. The texture atlas includes, for example, rectangular slices, where each slice is a sectional step in depth. Operation 120 can include attaining information from the user regarding the structure of each slice. For example, the user can provide an instruction with respect to the resolution of each slice and the total number of slices. Otherwise, these parameters can be determined by the automated process based on the actual resolution of the LED grid. This allows the process to optimize the position-based media pipeline method 100 for the actual resolution of the LED grid.

Texture Atlas Mapping Method for Volumetric Display

Method 200 will be described with respect to FIGS. 2A to 2D. FIGS. 2B to 2D used herein are for illustrative purposes only and are not to scale. In addition, FIG. 2B to 2D may not reflect the actual geometry of the animated structures, features, or layers. Some structures, layers, or geometries may have been deliberately augmented or omitted for illustrative and clarity purposes.

Figure 2A:
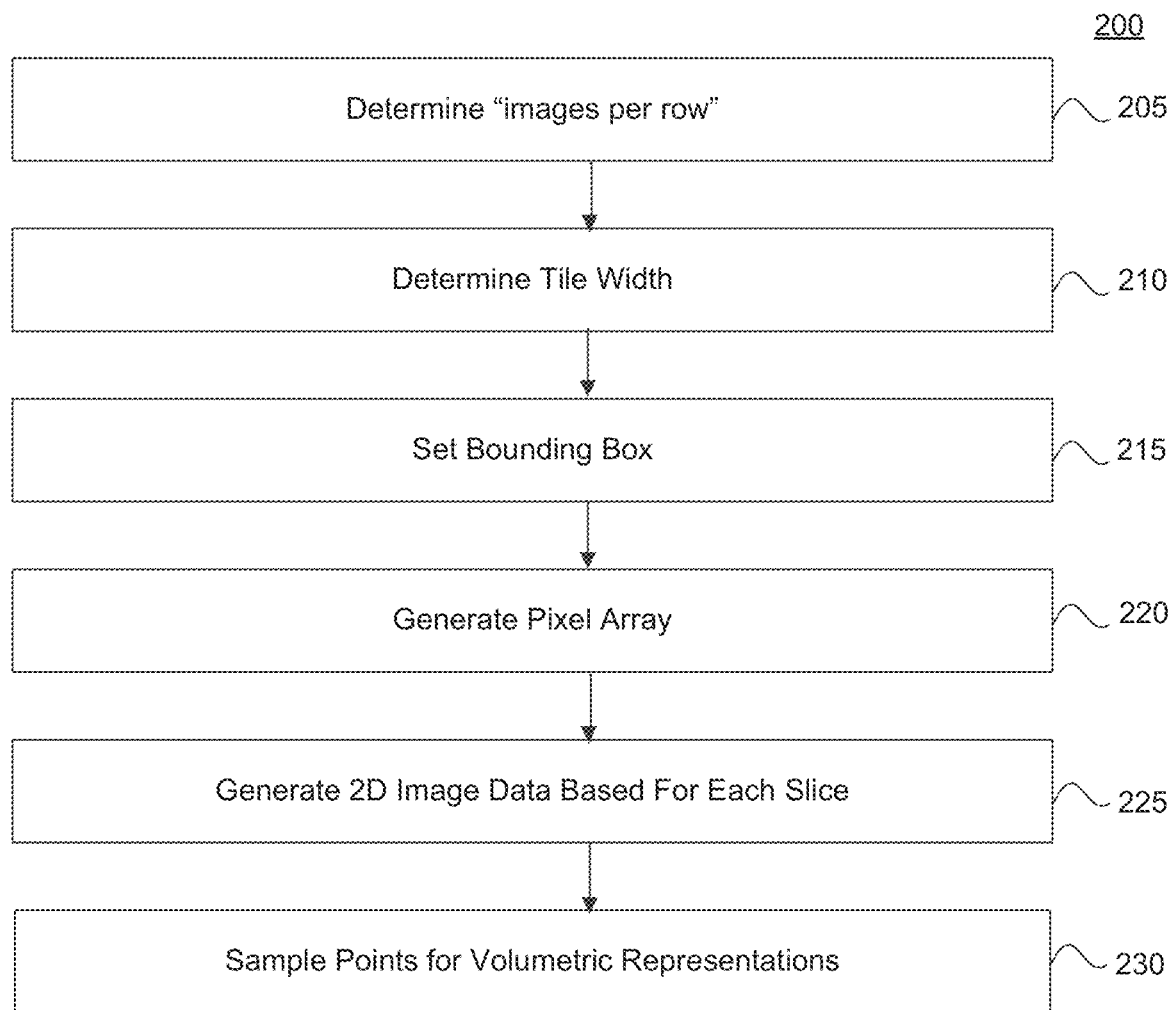
FIG. 2A is a flow diagram of a texture atlas mapping method for a position-based media pipeline, according to some embodiments.
Figure 2B:
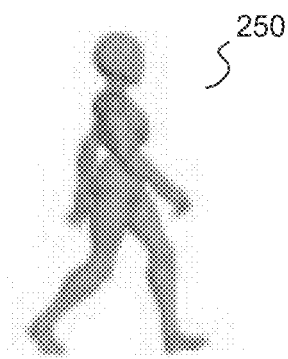
FIGS. 2B to 2D are illustrations of an exemplary frame of a 3D animation, a volumetric representation of the 3D animation, and a texture atlas of the volumetric representation, respectively, according to one non-limiting example of some embodiments.
Figure 2C:
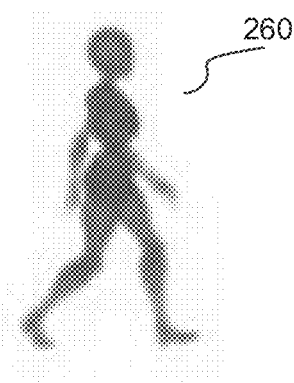
Figure 2D:
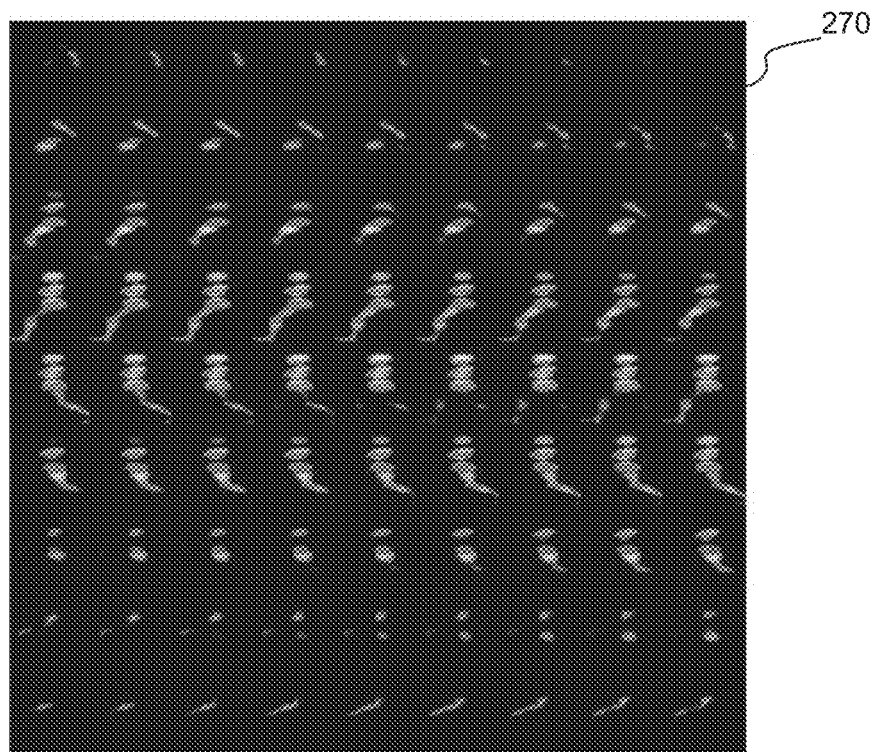

FIG. 2A illustrates a volumetric display texture mapping method, according to some embodiments. Initially, a user can define the number of slices and the resolution of each point of the volumetric representation. The texture mapping method 200 provides a function to create the texture atlas by mapping a 2D (x,y) spatial coordinate into a 3D (x,y,z) spatial coordinate, which is used to sample the volumetric representation of an animation. In the texture mapping method 200, the resulting volumetric representation has a 3D sample coordinate space that resides within a virtual boundary box of the point cloud.

A map function of the texture mapping method receives as paramaters an input value (inValue), input volume minimum and maximum values (inMin and inMax, respectively) and output volume minimum and maximum values (outMin and outMax, respectively). The map function returns a value based on inValue within the range bounded by inMin and inMax, extended by the dimensions of the range bounded by outMin and outMax. In one non-limiting example, if inMin and inMax are 0 and 10, respectively, then the range defined by those parameters is 0 to 10. In this example, outMin and outMax may be set to define a range from 0 to 100. If inValue is provided as 5, then the map function will return a value of 50, i.e., the position of inValue extended by the range defined by outMin and outMax. In one embodiment, the map function returns a value as follows:

map=outMin+(outMax−outMin)*(inValue−inMin)/(inMax−inMin).

The texture atlas is normalized to the coordinates, (width, height and depth) of the volumetric 3D display. The volumetric display outer shell is interpreted as the maximum boundaries of the texture atlas. Initially, the number of slices are determined within these maximum boundaries. The number of slices can generally be set, for example, equal to or greater than the number of pixel rows. Generally, the user may input or modify the number of slices. For example, the number of slices can be increased to provide interpolated texture atlas or less to generate a low resolution effect or to save space.

Referring to FIG. 2A, texture mapping method 200 includes operation 205, where an "images per row" (IPR) parameter is determined. The IPR computation is performed in view that the number of user-designated slices will not always fit into an image file perfectly. The IPR process determines how many of those slices can fit in the data constraints of an image file.

The IPR represents the width of each slice based on the user-defined number of slices. In one embodiment, the IPR is determined based on the ceiling function (i.e., the smallest integer not less than) of the square root of the user-defined number of slices. For example, if a user defines one hundred slices for a volumetric representation, operation 155 will result in IPR (i.e., the volume resolution or voxel) being set to 10. Ceiling in case square root is not a whole number, extra black space in that image.

Referring to FIG. 2A, texture mapping method 200 continues with operation 210, where the tile width (tileWidth) is set as the inverse of the IPR. Tile width represents the width of each slice within the 2D image file.

Texture mapping method 200 continues with operation 215, where the bounding box (bbox) is set. The bounding box, which can be an array, such as a three-dimensional reference array, defines the outer shell of each pixel of the volumetric display. The bounding box is determined to the volume of the 3D representation is set to equal the bounding box of the point cloud by the equation:

bbox.xyz=inputPointCloudBoundingBox.xyz.

Texture mapping method 200 continues with operation 220, where an array defines each three-dimensional point, which is set for every pixel value of each coordinate of the point cloud of the volumetric representation. In some embodiments, an array is set as follows:

pixel.xyz=inputPointCloud.point.xyz, where pixel.xyz represents the pixel for each coordinate space of the volumetric representation and inputPointCloud.point.xyz represents the coordinate space of the point cloud.

Texture mapping method 200 continues with operation 225, where two-dimensional image data for each slice is determined based on the pixel array. In some embodiments, each slice is set to the floor value of the two-dimensional coordinate space of the volumetric representation that is extended by IPR. For example, each slice can set by the equation:

sliceID.xy=floor(pixel.xy*imagesPerRow), where sliceID represents one slice of the volumetric representation.

Texture mapping method 200 continues with operation 230, where the points of the volumetric representations set at operation 220 are sampled for each slice, extended by the boundary box values (boundary box minimum and boundary box maximum). In some embodiments, the map function is performed as follows to perform the sampling operation:

volume SampleCoordinate.xy=map(pixel.xy,tileOrigin,tileOrigin+tileWidth, bbox.min.xy, bbox.max.xy), where tileOrigin represents the Origin (e.g. 0,0) of each slice and tileWidth represents the width of each slice (as determined in operation 210).

That is, each user-defined slice is sampled from the top left pixel to the final pixel. Thus, for every pixel of the point cloud, the depth is divided into slices which are individually scanned to determine the interior contents of each 2D slice. Once a 2D slice is completed, texture mapping method 200 continues moving to the next 2D slice depth portion. For each slice, the 2D volumetric representation is mapped to a corresponding image of the coordinate space. Operation 230 can include execution of the map function to sample each slice to a volumetric representation FIGS. 2B to 2D illustrate generation of an exemplary texture atlas based on a volumetric representation. As shown in FIG. 2B, a frame of a three-dimensional animation can be generated by an animator or other process. FIG. 2C, illustrates a volumetric representation of the three-dimensional animation, colorized by an illustrator or other process.

An example of a texture atlas sampled from the volumetric representation is illustrated in FIG. 2D. In one embodiment, the texture atlas can be generated based on method 200. As shown, each slice of the volumetric representation is arranged in the image file. That is, the texture atlas contains a plurality of images that constitute the volumetric representation of the three-dimensional shown in FIG. 2C.

A benefit is achieved by method 200, in that where the imagery of the volumetric display is grid based, the content (e.g., a human walking) can be organic and fluid. By sampling a point in space, it is not necessary for the sampled volume to rigidly follow the grid based arrangement. This is advantageous, for example, where the number of slices is set by an arbitrary value, user-defined, or the like. For example, sample content that exists between grid coordinates, e.g., at a floating point rather than an integer coordinate value can be weighted based on proximity to each sample point. Thus, blending between values can be achieved based on the function of method 200. For example, the color of the texture can be determined based on floating point number, such as the texture coordinate at x=1.5, y=2.5. The map function process of method 200 provides a weighted average based on the proximate coordinates. By this process, the pixel value of a point not firmly fixed to a grid can be weighted between all pixels in the surrounding space.

This is also advantageous, where the physical grid is not confined to the same coordinate space of the virtual grid. For example, a physical grid can follow any arrangement, such as a curved arrangement of LED columns. The virtual grid, on the other hand, fits inside a texture atlas and can be uniform. Moreover, the number of slices can be set based on the resolution requirements, and/or reducing required resources. For example, an increased number of slices could result in oversampling to achieve a cleaner result, but requiring greater resource usage, such as disk space. Or, a user can define a lower number of slices to achieve the opposite trade-off.

Texture Atlas Output Methods

Figure 3A:
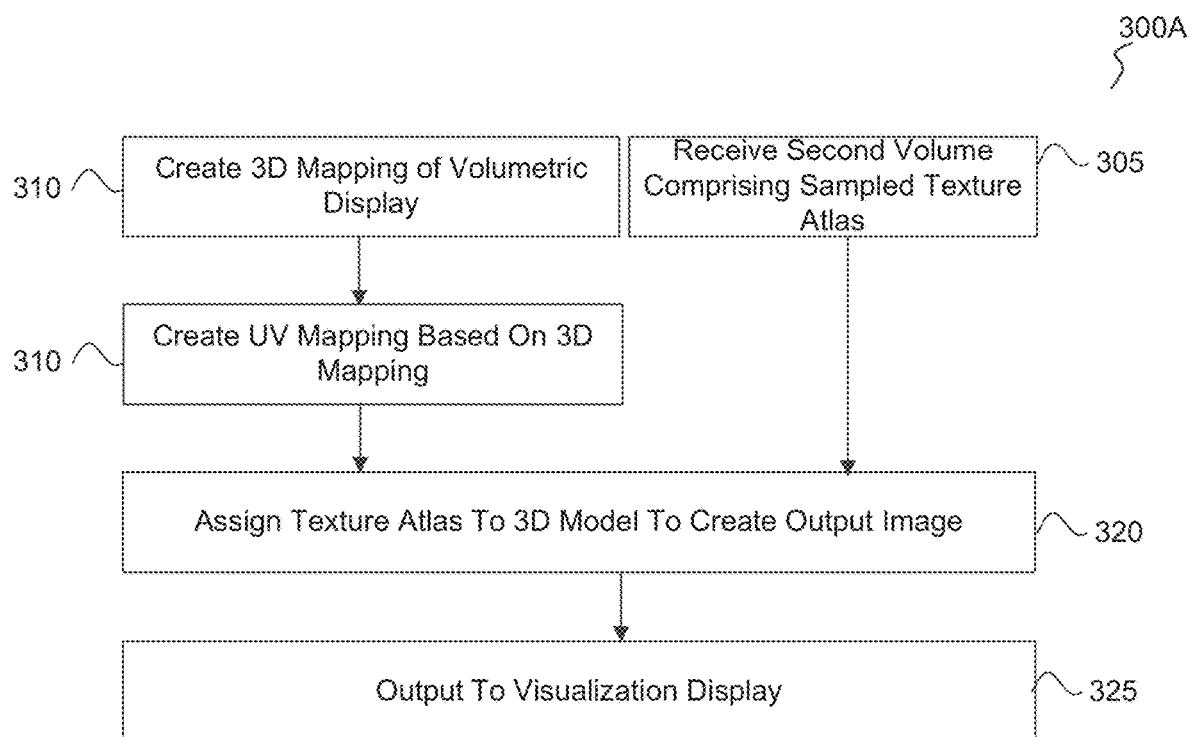
FIG. 3A is a flow diagram of a position-based media pipeline visualization method, according to some embodiments.
Figure 3B:
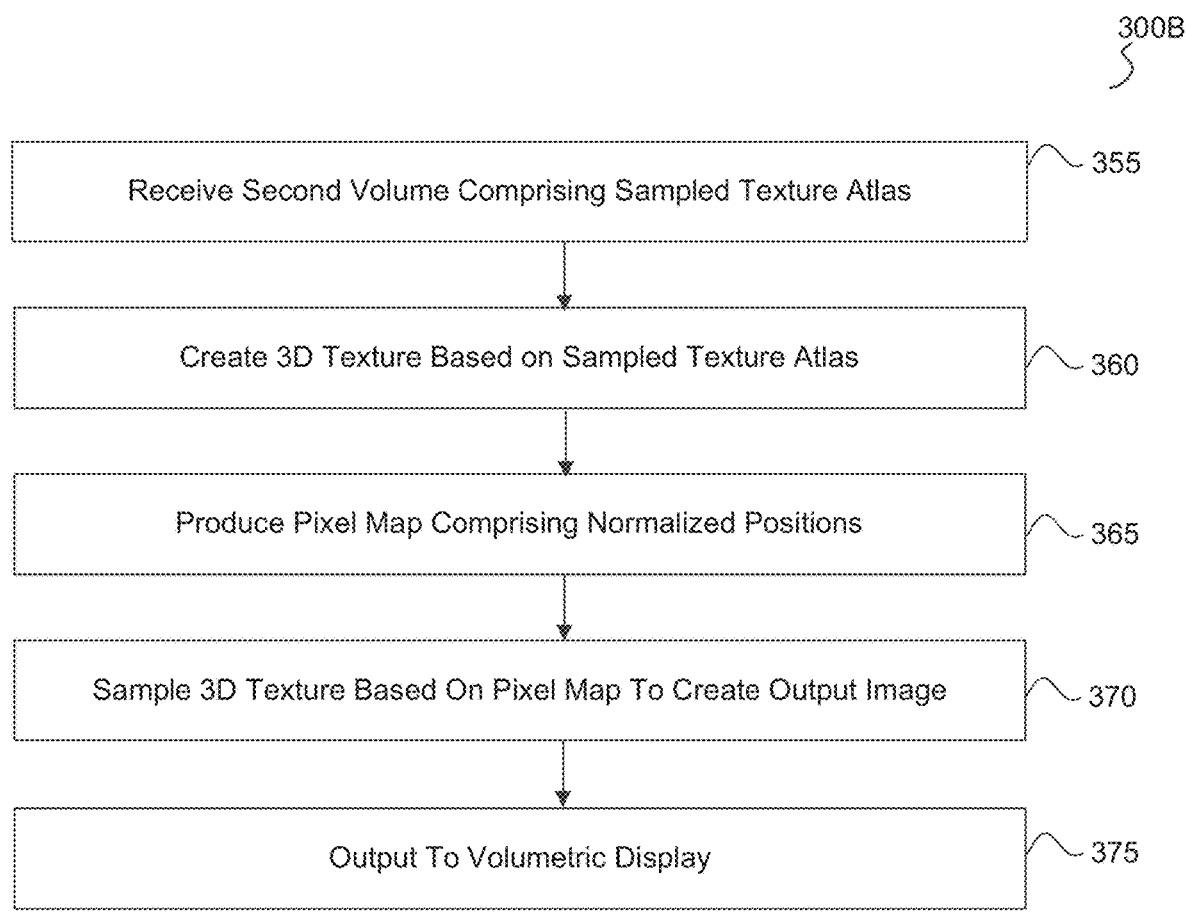
FIG. 3B is a flow diagram of a position-based media pipeline volumetric display output method, according to some embodiments.

FIGS. 3A and 3B illustrate a position-based media pipeline method to output a texture atlas as one or more output image, according to some embodiments. The PBMP texture atlas output methods can include methods to provide an output image rendered on a variety of displays, including one or more volumetric displays, one or more display screens, other forms of graphical display, or a combination thereof. For example, the PBMP texture atlas output methods can include a visualization output method 300A as illustrated in FIG. 3A, and a volumetric display output method 300B as illustrated in FIG. 3B.

Referring to FIG. 3A, visualization output method 300A includes operation 305, where the second volume comprising the sampled texture atlas is provided as an input. As noted above, the texture atlas is a volumetric representation of an animation sampled from the volume. The texture atlas can be a texture atlas created by sampling a series of slices, as described in the embodiment of FIGS. 2A to 2D. In some embodiments, the texture atlas can be a texture atlas containing a series of rectangular textures.

Visualization output method 300A continues with operation 310, where the PBMP generates a 3D mapping of the target volumetric display. The 3D mapping can be generated based on a three-dimensional (3D) pixel position data set provided as an input to the texture atlas output method, or can be generated by an automatic process. A process for generation of the 3D mapping can include a process of generating a pixel map that includes normalized positions of a coordinate space of one or more volumetric displays. The process of generating the pixel map can include translating, by the one or more computers, the 3D coordinate space of a volumetric display to a 2D coordinate space.

Visualization output method 300A continues with operation 315, where the PBMP generates a volumetric display UV-mapping by UV-mapping a 3D model of the target volumetric display. Operation 315 can be performed separately, or as part of operation 310 described above. A volumetric display UV-mapping can be generated as an assignment of each 3D point of the target volumetric display to a corresponding point of a 2D domain (e.g., each point in a 2D rectangular, polygon or other geometric domain). The volumetric display UV-mapping enables a 3D texture to be mapped to the resulting 2D volumetric display UV-mapping. The UV-mapping includes the volumetric display (x,y,z) coordinates flattened into a 2D (u,v,w) space (also referred to as a "tile"). In some embodiments, operation 315 includes a UV-mapping process of converting the 3D coordinate space into one or more of a planar coordinate space, a spherical coordinate space, or a cylindrical coordinate space. Then the given coordinate space is flattened or extracted into a 2D coordinate by providing two or more coordinates of the given coordinate space as the U and V (and optionally W) coordinates.

Visualization output method 300A continues with operation 320, where a 3D texture is generated based on the texture atlas. The 3D texture contains the contents of the texture map (e.g., texture atlas 270) to be represented in the 3D volumetric display. As described above, the UV map is a mathematical mapping of the coordinates of a 3D surface to the coordinates of a 2D image. Therefore, the color of a surface element is equal to the color of its corresponding pixel in the texture map. Thus an output image is created, including the volumetric display UV-mapping. Operation 320 can include programmatically mapping a volumetric display UV-mapping mapped in accordance with corresponding points of the texture atlas. As described above, UV mapping is the process of generating a mapping of the volumetric display to each 2D slice.

Visualization output method 300A continues with operation 325, where the output image, i.e., the volumetric display UV-mapping, can be output to a graphic controller of a display, such as a display screen of a computer. Thereby, visualization output method 300A permits a user to preview in real-time on a 2D computer screen, what volumetric display content would look like when presented on a volumetric display. As noted above, visualization output method 300A includes an operation 310 of generating a 3D mapping of the target volumetric display. Thereby, visualization output method 300A enables users to compare many possible lighting (e.g., LED) products and physical layouts using the same animated content. Thus, one advantage of embodiments described herein is the acquisition of insights in physical design based on the visualization output method that matches visualization output to a physical construction of a volumetric display.

The visualization output method 300A achieves a function to enable a user to preview different grid layouts, LED hardware, support structures, and the like in preparing a volumetric display volume. A visualizer of the PBMP permits user to observe, for example, in real-time on a 2D display screen, how content would appear in a 3D LED matrix. The PBMP visualizer enables the user to quickly compare many possible LED products, physical layouts, etc., using the same animation volume, providing key insights in the physical design.

Embodiments of the present disclosure achieve criticality in providing a visualization output method that is based on the volumetric display UV-mapping. For example, if a known LED product is provided in LED strips having groups of 10, then a pixel map may be provided having a 10 pixel-wide dimension. Another LED product may include LED strips having twenty pixels in a length direction, a width direction, or a depth direction. Still another LED product may include forty-eight pixels in any pattern. Accordingly, embodiments disclosed here in provide a visualization output method that enables a user to easily preview, edit and manage generation of a volume to be output to a volumetric display.

Referring to FIG. 3B, volumetric display output method 300B includes operation 355, where the second volume comprising the sampled texture atlas is provided as an input. As with visualization method 300A above, the texture atlas is a volumetric representation of an animation sampled from the volume. The texture atlas can be a texture atlas created by sampling a series of slices, as described in the embodiment of FIGS. 2A to 2D. In some embodiments, the texture atlas can be a texture atlas containing a series of rectangular textures.

Volumetric display output method 300B continues with operation 360, where the PBMP creates a 3D texture. Operation 360 can include a process of translating the sampled texture atlas, provided as an input above (which can be an embodiment of a texture atlas sampled by method 200) into a 3D texture. In some embodiments, operation 360 can include one or more steps of texture mapping method 200, the process of generating the texture atlas, but performed in a reverse sequence. For example, the two-dimensional image data of each slice included in the image file can be mapped to the coordinate space of the volumetric display utilizing the map function described above with respect to method 200. The 3D texture contains the contents of the texture map (e.g., texture atlas 270) to be represented in the 3D volumetric display. Thus, the 3D texture is reconstructed from the texture atlas into a graphical object to be provided as output image data.

Volumetric display output method 300B continues with operation 365, where the PBMP produces a pixel map that includes normalized positions of 3D coordinates of the target volumetric display. The pixel map can be produced based on a three-dimensional (3D) pixel position dataset provided as an input to the texture atlas output method, or can be generated by an automatic process. A process for generation of the 3D mapping can include a process of generating a pixel map that includes normalized positions of a coordinate space of one or more volumetric displays. The process of generating the pixel map can include translating, by the one or more computers, the 3D coordinate space of a volumetric display to a 2D coordinate space.

Volumetric display output method 300B continues with operation 370, Operation 370 can include programmatically mapping a volumetric display UV-mapping mapped in accordance with corresponding points of the texture atlas. As described above, UV mapping is the process of generating a mapping of the volumetric display to each 2D slice. The UV map is a mathematical mapping of the coordinates of a 3D surface to the coordinates of a 2D image. Therefore, the color of a surface element is equal to the color of its corresponding pixel in the texture map.

Volumetric display output method 300B continues with operation 375, where the volumetric display UV-mapping can be output to a graphic controller of a volumetric display, e.g., the LED grid. Because the same texture atlas generated from the PBMP and output in visualization output method 300A is applied as a texture map onto the volumetric display (e.g., the LED grid), volumetric display output method 300B presents image data to the volumetric display that matches the visualized content. Thus, the PBMP provides an efficient way for anyone, including potential third-party developers, to see volumetric content in virtually any 3D environment.

Position Based Media Pipeline System

Figure 4:
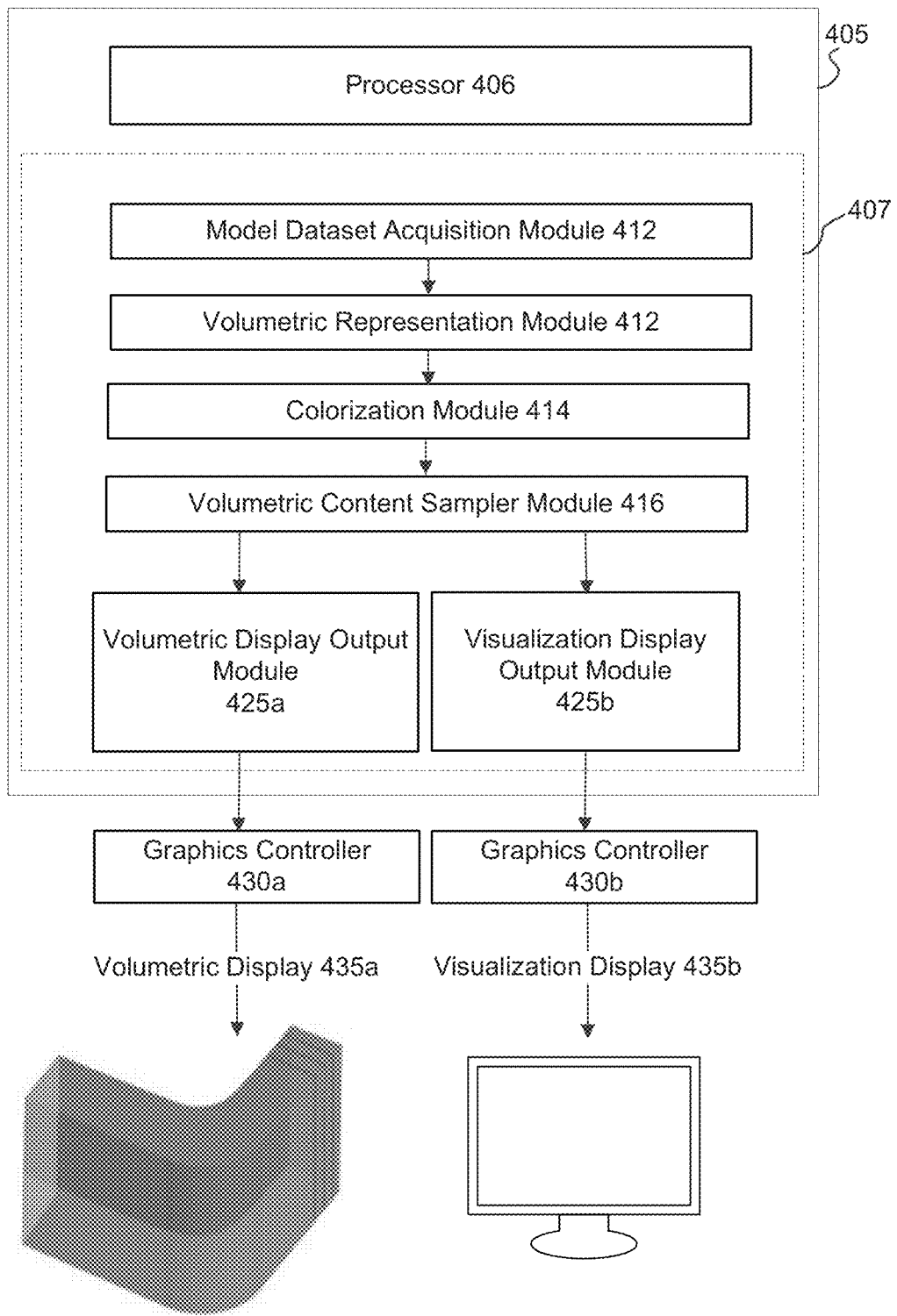
FIG. 4 is an illustration of a position-based media pipeline system, according to some embodiments.

FIG. 4 illustrates a PBMP system according to some embodiments. Referring to FIG. 4, PBMP system 400 includes a device 405 coupled to graphics controller 430a and graphics controller 430b. The device 405 is configured to generate a display that can be uniformly rendered, for example, in a 3D coordinate space of volumetric display 435a and a 2D coordinate space of visualization display 435b. The PBMP system 400 is provided to render image content that a user can create, design, preview and modify for a target volumetric display 435a. The image content can be based on 3D animation provided as a unitary graphic for both displays and a 3D model dataset of the volumetric display 435a.

In some embodiments, volumetric display 435a can include one or more LED products arranged in any configuration. In some embodiments, volumetric display 435a can include more than one LED columns arranged in a 3D geometry. In some embodiments, visualization display 435b can be for example, a Liquid Crystal Display (LCD), a Light-Emitting Diode (LED) display, an Organic Light-Emitting Diode (OLED) display, a projector-based display, an electronic paper display, or the like. In some embodiments, visualization display 435b can include more than one display device.

Device 405 can be a computing device having a processor 406 and a memory 407. Processor 406 is adapted to run instructions stored in memory 407. Processor 406 may be a micro-controller unit (MCU), a digital signal processor (DSP) and/or an Image/Video Processing unit or like components that run instructions. One or more processors 406 may be present. Processor 406 may be an independent component, or it may also be embedded in another component Memory 407 may include random access memory (RAM) and may also include nonvolatile memory, such as read only memory (ROM) and/or flash memory. Memory 407 may be an independent memory component, or may be embedded in another component, such as processor 406, graphics controller 430a, and/or graphics controller 430b, or may be a combination of two, or may include a plurality of memory components. Memory 407 may include a detachable memory module such as a flash memory card. Memory 407 is adapted to include software modules (a module is a set of instructions). In particular, memory 407 can include a model dataset acquisition module 410, volumetric representation module 412, colorization module 414, volumetric content sampler module 416, volumetric display output module 425a and visualization display output module 425b.

Model dataset acquisition module 410 creates or acquires a 3D model dataset of all pixel positions of a target volumetric display. The volumetric display is not limited with regard to a specific shape, and can have pixels that exist anywhere in space or orientation. Model dataset acquisition module 410 can determine and scale the exact position of the LEDs of the volumetric display in generating a dataset of pixel positions. In some embodiments, model dataset acquisition 410 acquires a point cloud that includes information about every pixel to be included in the volumetric display. This can be done by modeling or sensing the position data to obtain each height, width, and depth coordinate (X,Y,Z) of a given pixel in the volumetric display. In other embodiments, volumetric representation module 410 receives an input by a user of a 3D model dataset.

Volumetric representation module 412 receives image content, for example, user-generated image content, such as 3D image content created using a 3D animation tool. Volumetric representation module 412 can receive user-generated the 3D animation that the user imports into the position-based media pipeline, such as 3D animation using a vertex/polygon model. In some embodiments, the 3D geometry and any associated effects (e.g., smoke, liquids, destruction) can be first animated relative to the pixel positions. Volumetric representation module 412 converts the 3D animated content to a volumetric representation based on the model dataset created in model dataset acquisition module 410.

Colorization module 414 adds color content to the volumetric representation. Specifically, colorization module 414 adds color content to the density gradient of the volumetric representation. This color content can be added to the volume, for example, based on an input or by interpreting the volume from a texture map. Or, the color field can be based on the density gradient. In other examples, colorization module 414 can colorize the volume based on some other algorithm, such as a complex custom effect. Colorization module can be configured to provide additional information about geometric volume, such as the exterior boundary thereof.

Volumetric content sampler module 416 progressively samples the colorized volumetric representation along its depth to create discrete slices based on the continuous color and density information. The discrete slices are then imported in a texture atlas and stored in the form of images. The volumetric content sampler can include, for example, storing the discrete slices as rectangular slices of a texture atlas.

Volumetric display output module 425a provides an output image based on the texture atlas to a graphics controller 430a coupled to a volumetric display 435a. Volumetric display output module 425a creates a 3D texture based on a texture atlas provided by volumetric content sampler module 416. Volumetric display output module 425a can translate the sampled texture atlas into a 3D texture. Volumetric display output module 425a produces a pixel map that includes normalized positions of 3D coordinates of the target volumetric display and programmatically maps a volumetric display UV-mapping mapped based on corresponding points of the texture atlas. Volumetric display output module 425a provides the volumetric display UV-mapping as an output to a graphic controller 430a of a volumetric display 435a, which can be an LED grid, for example.

Visualization display output module 425b provides an output image based on the texture atlas to a graphics controller 430a coupled to a visualization display 435b. Visualization display output module 425b, generates a three-dimensional (3D) pixel position dataset based on the 3D model dataset of the target volumetric display and UV-maps the 3D pixel position dataset to create a volumetric display UV-mapping by UV-mapping a 3D model of the target volumetric display. A 3D texture for the volumetric display is generated based on the texture atlas provided by volumetric content sampler module 416 and applied to the volumetric display UV-mapping. The 3D texture contains the contents of the texture map to be represented in the 3D volumetric display. Visualization display output module 425b provides an output image representing the volumetric display UV-mapping to a graphic controller 430b of a visualization display 435b, such as a display screen of a computer. Thus, visualization display output module permits a user to preview in real-time on a 2D computer screen, what volumetric display content would look like when presented on a volumetric display.

Each of the processors, modules, terminals, and applications in FIG. 4 may be implemented in hardware, software, firmware, or any combination thereof implemented on a computing device. A computing device can include, but is not limited to, a device having a processor and memory, including a persistent, nontransitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Examples

FIGS. 5A to 5C and 6A to 6B illustrate example applications of the position-based media pipeline for volumetric displays.

Figure 5A:
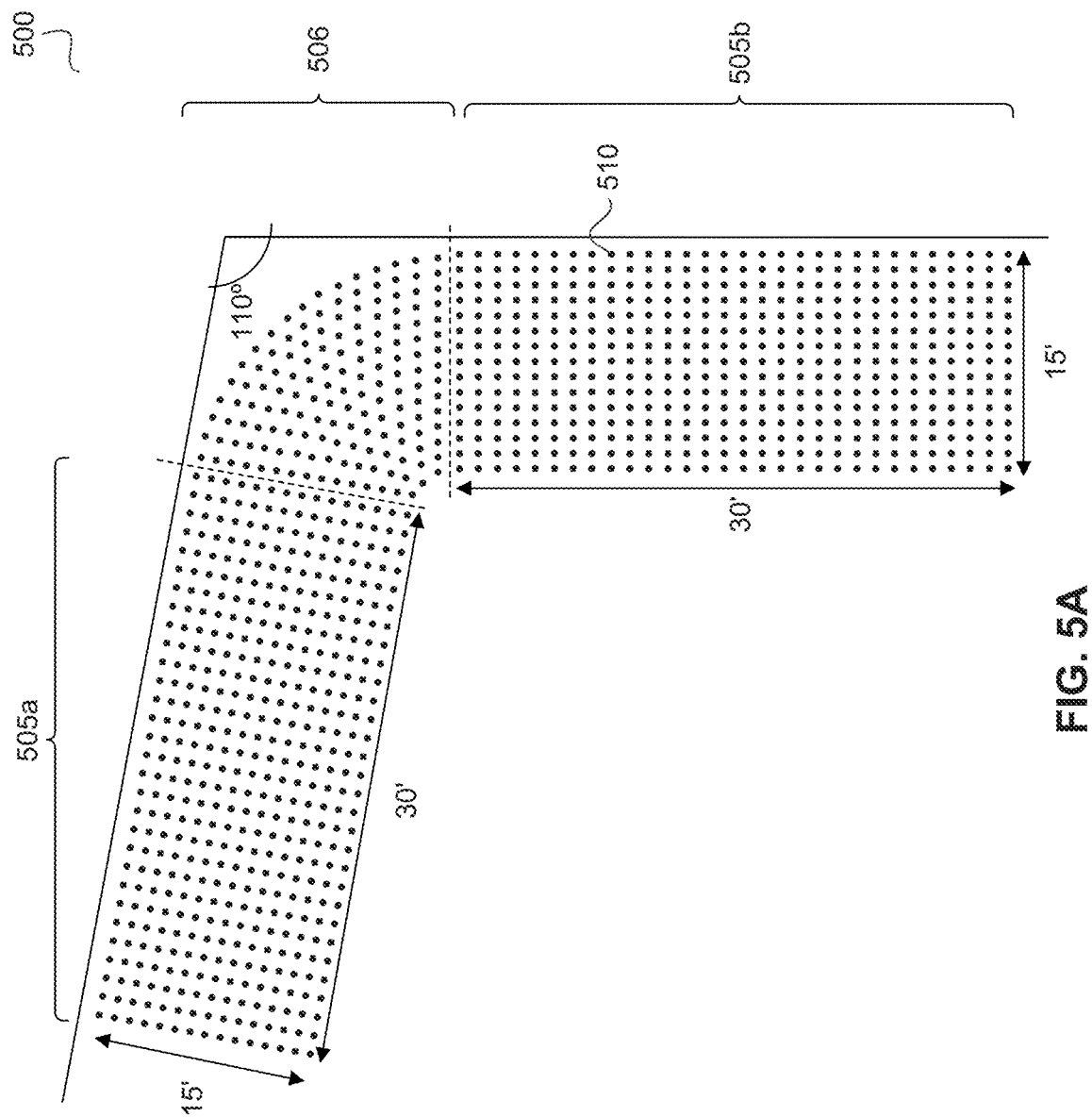
FIGS. 5A to 5C are illustrations of an exemplary volumetric display rendered by a position-based media pipeline, according to some embodiments.
Figure 5B:
Figure 5C:
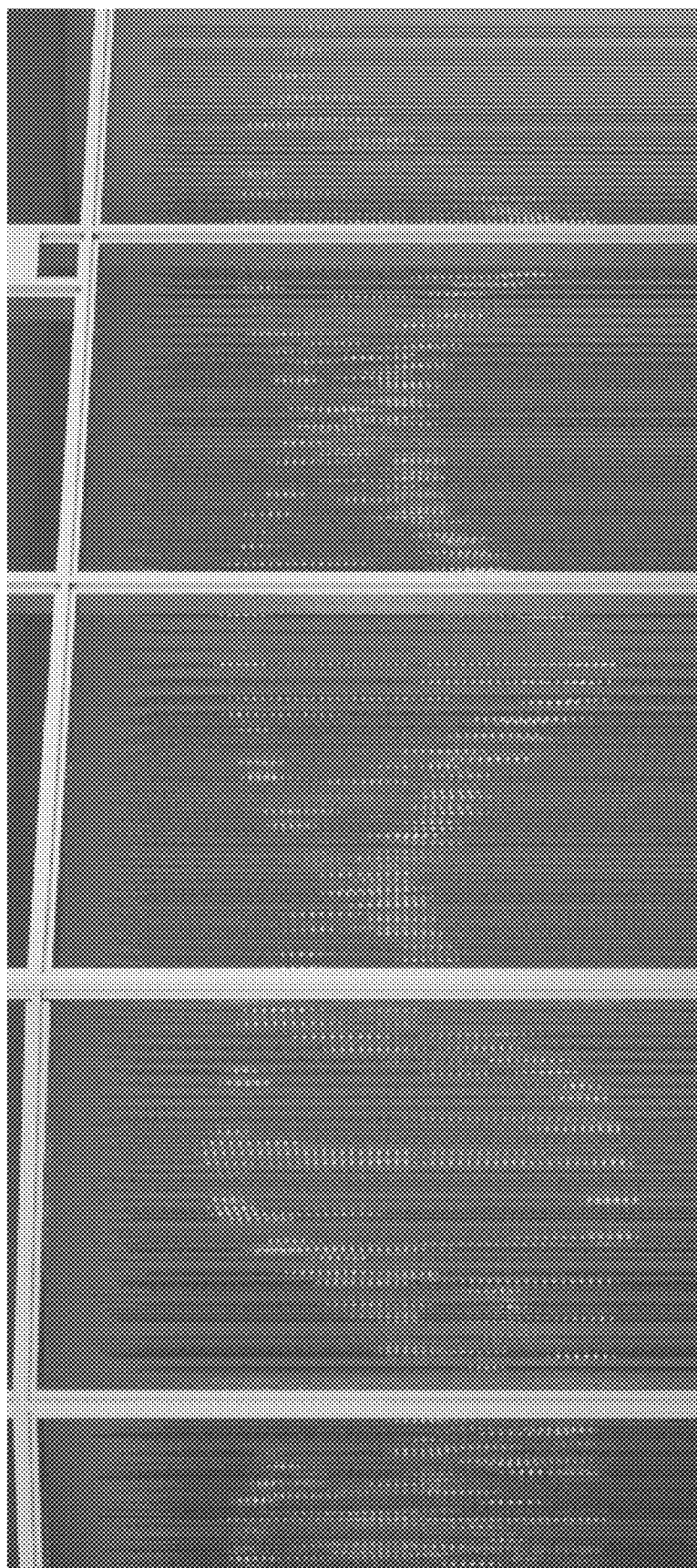

FIGS. 5A to 5C illustrate an exemplary application of the position-based media pipeline for volumetric displays. FIG. 5A illustrates a schematic of a volumetric display 500 of LED columns. Referring to FIG. 5A, volumetric display 500 includes one thousand and fifty LED columns 510 (also referred to as "drops). Volumetric branches 505a and 505b have dimensions of approximately 30 feet by 15 feet, and include four hundred and fifty LED columns each. Volumetric central portion 506 includes a 110° curve, and includes one hundred and fifty LED columns. Each LED column is spaced approximately twelve inches apart. In one example, each LED column may include a chain of forty-eight evenly-spaced LEDs.

The schematic is implemented as a 3D model dataset of the volumetric display. With reference to FIGS. 5B and 5C, an animation can then be input to the position-based media pipeline for preparing an arbitrary display to be output to volumetric display 500. position-based media pipeline provides a simulation tool allowing users to quickly compare and visualize different LED densities and enables users to deliver 3D volumetric representations of animation instead of 3D projections onto 2D images.

Referring to FIG. 5A, a schematic of an exemplary volumetric display is illustrated. In this example, a volumetric display is a 3D field of pixels filling two 15-feet-long, 8-feet high, 6-feet deep spaces, plus a curved section connecting the two. Volumetric display visualization according to embodiments described herein permits users to best define the installation form factor by studying different 3D information unit (also referred to as "voxel") configurations. In one non-limiting example, relationships between display density and occlusion can be determined and experimented with, as to each light source's exposure at ambient viewing locations. Volumetric display visualization models the physical structure of the volumetric display (e.g., the lighting assembly, such as a display including one or more drops) being developed or considered. Thus, users are enabled to adjust spacing, count and other attributes to simulate how content displayed on the screen would appear.

Embodiments disclosed herein address not only the end point, i.e., addressing the LEDs, but also permit users to review, create, and experiment in the process of providing a pixel map. Because the visualization process includes the same or similar source material and logic for previewing as the actual output to the display controller hardware, users (e.g., artists, designers, engineers, producers, and the like) are enabled to easily review content with accuracy before the content is deployed onto the volumetric display.

Referring to FIGS. 5B and 5C, an exemplary 3D animation was generated using the position-based media pipeline for a volumetric display is illustrated. The 3D animation illustrates DNA sequencing technology through DNA strands being constructed and deconstructed. Referring to FIG. 5B, a visualization of an output image is shown based on a texture atlas assigned to the 3D model of the DNA sequencing animation. As described above, a 3D mapping of the volumetric display schematic and a sampled texture atlas are provided as inputs to an output module of the position-based media pipeline. In FIG. 5B, the, the 3D model is converted into a UV mapping. The texture atlas is assigned to the UV mapping to create an output model for display provided to the user.

Referring to FIG. 5C, the output module alternatively or additionally provides an output image for populating the volumetric display. As described above, a pixel map that includes normalized positions of each pixel position and a sampled texture atlas are provided as inputs to an output module of the position-based media pipeline. The output module creates a 3D texture based on the sampled texture atlas. The 3D texture is sampled based on the pixel map is sampled to create an output image, which is populated to the volumetric display as shown.

Figure 6A:
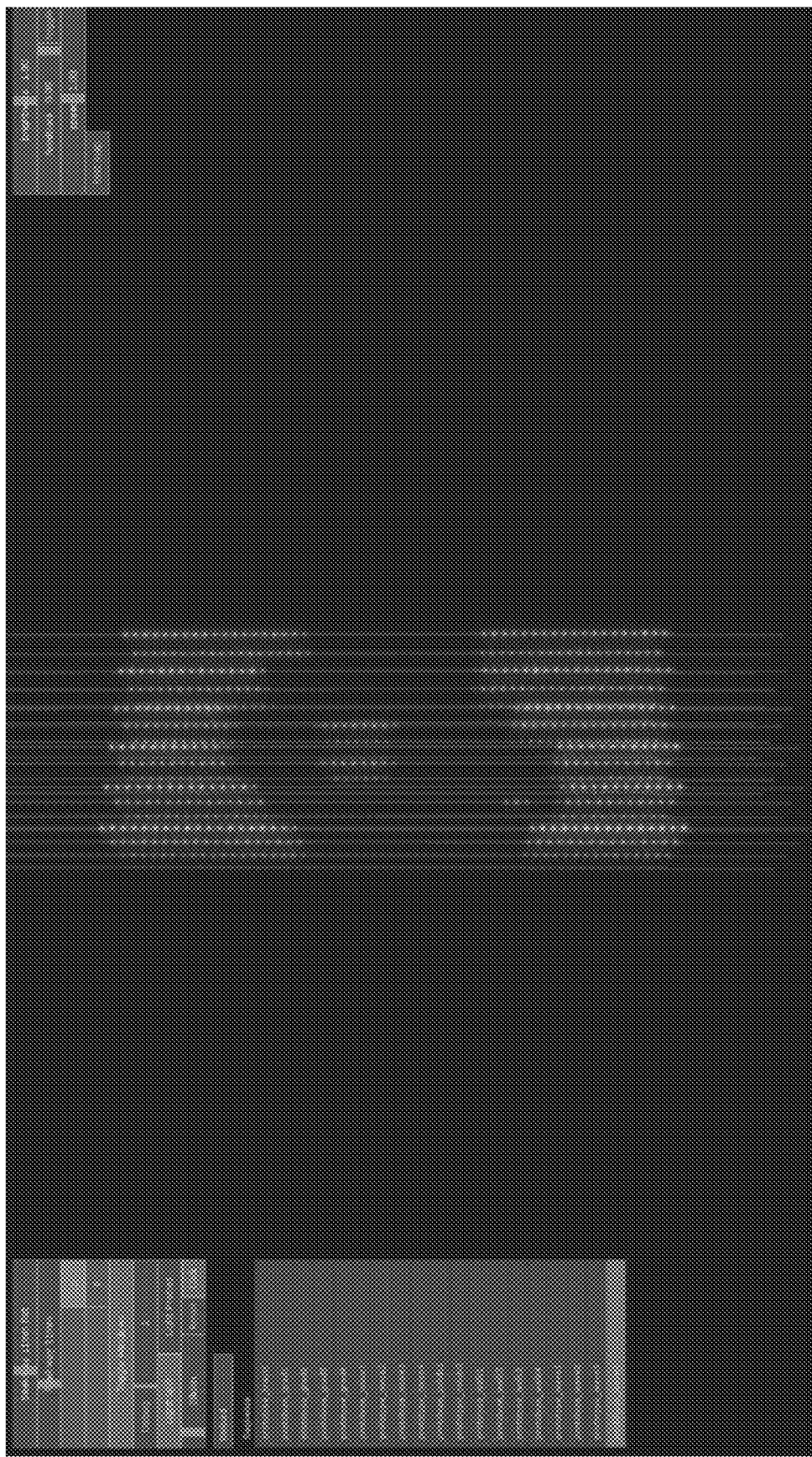
FIGS. 6A and 6B are illustrations of an exemplary volumetric display rendered by a position-based media pipeline, according to some embodiments.

Another exemplary system is illustrated with reference to FIGS. 6A and 6B. Referring to FIG. 6A, a visualization 600A of a volumetric display of LED columns is shown. The LED columns are based on a series of LEDs strung together and descending from a ceiling. The LED columns can be connected to LED controllers, which are connected to main board for receiving the video data. The video data can include 2D content representing a number of slices UV-mapped to the volumetric display.

For example, the LED columns being daisy chained together allows a pixel map to be generated based on that orientation. A person of ordinary skill in the art will understand that there may be other methods to acquire a pixel map and to synthesize a pixel map based on a known layout. One critical feature described herein is the portability of a volumetric representation of a 3D animation to either a visualization display or a volumetric display. Embodiments described herein include acquiring a pixel map by any method, generating position information and a texture atlas and populating color and information content.

Figure 6B:
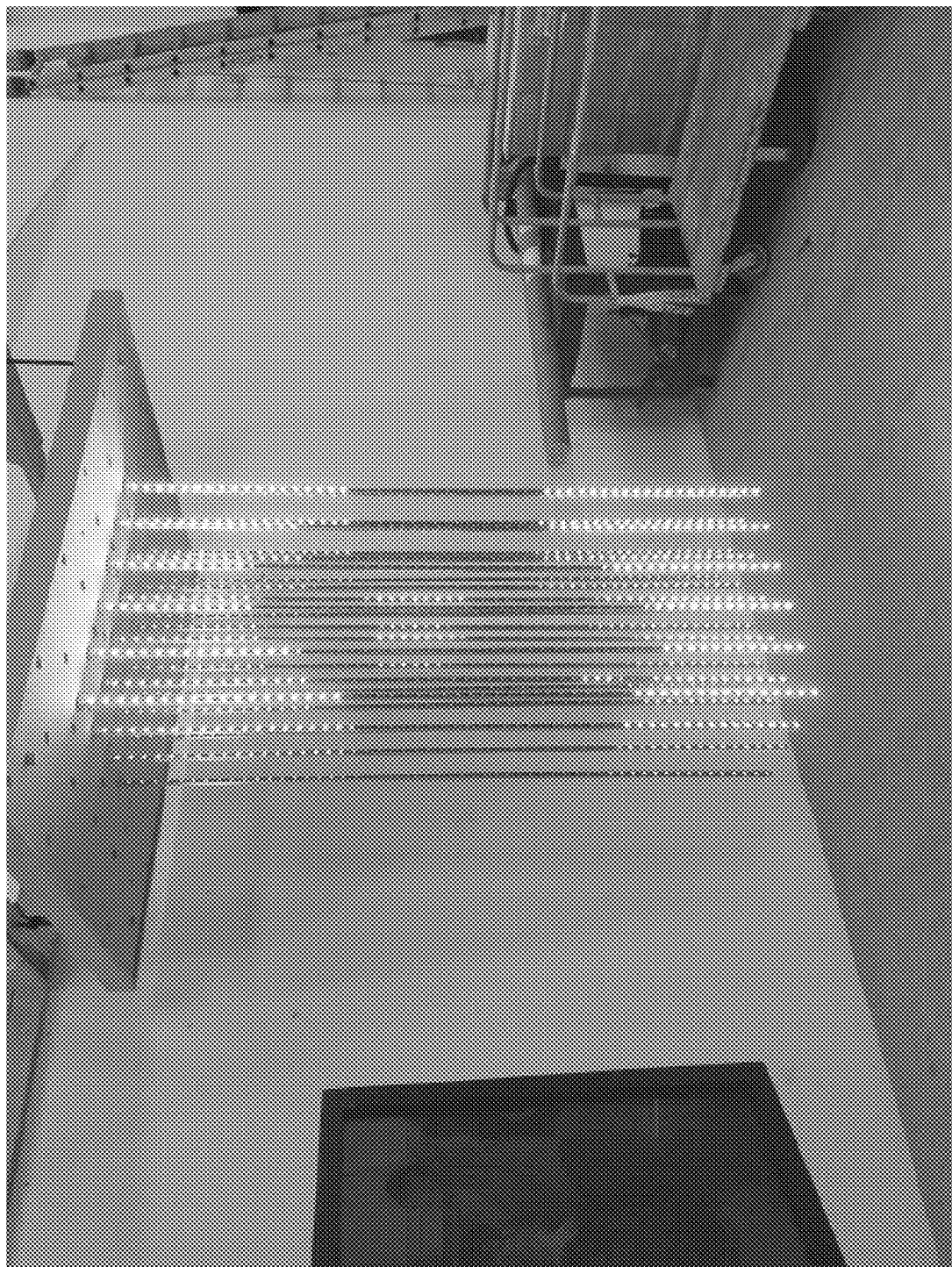

Referring to FIG. 6B, a volumetric display 600B of LED columns is shown. Volumetric display 600B includes LED columns descending from the ceiling and having an arrangement that accords with an arrangement shown in visualization 600A. As described above, a 3D model dataset based on volumetric display 600B is acquired for the arrangement output in visualization 600A. A plurality of pixels, such as the LED columns of volumetric display 600B, can be strung together, for example, in series. A 3D coordinate space is acquired to provide an arrangement for visualization 600A, while the volumetric display 600B is configured to receive volumetric image data and output the volumetric image data corresponding to the at least two pixels. The PBMP system can include a device, such as a device having a processor and a memory, that is configured to receive an input comprising a three-dimensional (3D) pixel position dataset and another input comprising a 3D animation. The PBMP system can perform a process to create a color data volume based on the 3D animation. The PBMP system can perform a process to assemble a texture atlas based on the color data volume and to generate volumetric image data based on the texture atlas. These processes can include a process for generating a pixel map of normalized positions of the pixel position dataset, and a process to output the volumetric image data by creating a 3D texture from the texture atlas. The normalized positions of the pixel position dataset correspond to a coordinate space of one or more volumetric displays. The volumetric image data can be output, as shown, as either visualization 600A or volumetric display 600B. By visualization 600A, a user can preview the volumetric image data.

CONCLUSION

A method includes receiving, by one or more computers, a first input comprising a three-dimensional (3D) pixel position dataset and a second input comprising a 3D animation; creating, by the one or more computers, a first volume representation based on the 3D animation; creating, by the one or more computers, a second volume based on the first volume, the generating including adding color data to the first volume; assembling, by the one or more computers, a texture atlas by sampling the second volume; generating, by the one or more computers, volumetric image data based on the texture atlas; and outputting, by the one or more computers, the volumetric image data. The outputting includes outputting the volumetric image data to one or more graphic controllers, where a user can preview the volumetric image data. The outputting further includes producing, by the one or more computers, a 3D texture from the texture atlas; and generating, by the one or more computers, a pixel map comprising normalized positions of the pixel position dataset. The normalized positions of the pixel position dataset correspond to a coordinate space of one or more volumetric displays, and the outputting includes outputting the volumetric image data to the one or more volumetric displays. The generating the pixel map includes translating, by the one or more computers, the 3D coordinate space of a volumetric display to a 2D coordinate space. The translating is performed by a UV-mapping process. The UV-mapping process comprises converting the 3D coordinate space into one or more of a planar coordinate space, a spherical coordinate space, or a cylindrical coordinate space.

A method includes receiving, by one or more computers, a texture atlas comprising one or more slices of a 3D animation; generating, by the one or more computers, a pixel map; sampling, by the one or more computers, the texture atlas to the pixel map to generate volumetric image data; and outputting, by the one or more computers, the volumetric image data. The method further includes outputting the volumetric image data to one or more graphic controllers, where a user can preview the volumetric image data. The pixel map includes normalized positions of a coordinate space of one or more volumetric displays and the outputting includes outputting the volumetric image data to the one or more volumetric displays. The generating includes translating, by the one or more computers, the 3D coordinate space of at least one of the one or more volumetric displays to a 2D coordinate space. The translating is performed by a UV-mapping process. The UV-mapping process comprises converting the 3D coordinate space into one or more of a planar coordinate space, a spherical coordinate space, or a cylindrical coordinate space.

A system includes a volumetric display having at least two pixels arranged in a 3D coordinate space, the volumetric display configured to receive volumetric image data and output the volumetric image data corresponding to the at least two pixels; and a device including a processor and a memory. The device is configured to receive a first input comprising a three-dimensional (3D) pixel position dataset and a second input comprising a 3D animation; create a first volume representation based on the 3D animation; create a second volume based on the first volume, the second volume including color data; assemble a texture atlas based on the second volume; generate volumetric image data based on the texture atlas; and output the volumetric image data. The device is further configured to output the volumetric image data to one or more graphic controllers, whereby a user can preview the volumetric image data. The device is further configured to generate a pixel map comprising normalized positions of the pixel position dataset, and output the volumetric image data by creating a 3D texture from the texture atlas. The normalized positions of the pixel position dataset correspond to a coordinate space of one or more volumetric displays. The device outputs the volumetric image data to the volumetric display. The device generates the volumetric image data by translating the 3D coordinate space of the volumetric display to a 2D coordinate space. The device translates the 3D coordinate space of the volumetric display to a 2D coordinate space by performing a UV-mapping process. The UV-mapping process comprises converting the 3D coordinate space into one or more of a planar coordinate space, a spherical coordinate space, or a cylindrical coordinate space.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method for creating volumetric media for display on a volumetric display, the method comprising:
    generating a model of a three-dimensional animation;
    converting the model of the three-dimensional animation to a three-dimensional representation of a surface of the three-dimensional animation;
    adding information relating to a three-dimensional interior volume enclosed within the three-dimensional representation of the surface of the three-dimensional animation to provide a volumetric representation of the three-dimensional animation; and
    sampling the volumetric representation of the three-dimensional animation along a plurality of depths to form a texture atlas having a plurality of slices of the volumetric representation of the three-dimensional animation along the plurality of depths.

2. The method of claim 1, wherein the three-dimensional animation comprises three-dimensional geometry of the three-dimensional animation and one or more effects associated with the three-dimensional geometry that are animated relative to a plurality of pixels of the volumetric display.

3. The method of claim 1, further comprising:
    receiving a three-dimensional model dataset of a plurality of pixel positions of the volumetric display, the three-dimensional model dataset including a height coordinate, a width coordinate, and a depth coordinate for each pixel position from among the plurality of pixel positions, and
    wherein the converting comprises:
        converting the model relative to the plurality of pixel positions to provide to the three-dimensional representation of the surface of the three-dimensional animation.

4. The method of claim 1, wherein the converting comprises converting the model to the three-dimensional representation of the surface of the three-dimensional animation to provide a plurality of density gradient parameters, the plurality of density gradient parameters ranging from zero at an outermost shell of the three-dimensional representation of the surface of the three-dimensional animation to one at an innermost shell of the three-dimensional representation of the surface of the three-dimensional animation, and
    wherein the adding comprises adding the information to the plurality of density gradient parameters to provide the volumetric representation of the three-dimensional animation.

5. The method of claim 1, wherein the converting comprises mapping two-dimensional spatial coordinates of the model of the three-dimensional animation into three-dimensional spatial coordinates to provide the three-dimensional representation of the surface of the three-dimensional animation.

6. The method of claim 1, wherein the information comprises information relating to an opacity of the three-dimensional interior volume, a color of the three-dimensional interior volume, an internal structure of the three-dimensional interior volume, or an apparent softness of a surface of the three-dimensional interior volume.

7. The method of claim 1, wherein the texture atlas comprises a plurality of rectangular slices of the volumetric representation of the three-dimensional animation, the plurality of rectangular slices being sectional steps in the plurality of depths with respect to one another.

8. The method of claim 1, wherein the sampling comprises normalizing the texture atlas to a plurality of pixel positions of the volumetric display, the plurality of pixel positions including a height coordinate, a width coordinate, and a depth coordinate for each pixel position from among the plurality of pixel positions.

9. An electronic device for creating volumetric media for display on a volumetric display, the electronic device comprising:
    a memory configured to store a plurality of instructions to create the volumetric media; and
    a processor configured to execute the plurality of instructions, the plurality of instructions, when executed by the processor, configuring the processor to:
        generate a model of a three-dimensional animation,
        convert the model of the three-dimensional animation to a three-dimensional representation of a surface of the three-dimensional animation,
        add information relating to a three-dimensional interior volume enclosed within the three-dimensional representation of the surface of the three-dimensional animation to provide a volumetric representation of the three-dimensional animation, and
        sample the volumetric representation of the three-dimensional animation along a plurality of depths to form a texture atlas having a plurality of slices of the volumetric representation of the three-dimensional animation along the plurality of depths.

10. The electronic device of claim 9, wherein the three-dimensional animation comprises three-dimensional geometry of the three-dimensional animation and one or more effects associated with the three-dimensional geometry that are animated relative to a plurality of pixels of the volumetric display.

11. The electronic device of claim 9, wherein the plurality of instructions, when executed by the processor, further configure the processor to:

receive a three-dimensional model dataset of a plurality of pixel positions of the volumetric display, the three-dimensional model dataset including a height coordinate, a width coordinate, and a depth coordinate for each pixel position from among the plurality of pixel positions, and convert the model relative to the plurality of pixel positions to provide to the three-dimensional representation of the surface of the three-dimensional animation.

12. The electronic device of claim 9, wherein the plurality of instructions, when executed by the processor, configure the processor to:

convert the model to the three-dimensional representation of the surface of the three-dimensional animation to provide a plurality of density gradient parameters, the plurality of density gradient parameters ranging from zero at an outermost shell of the three-dimensional representation of the surface of the three-dimensional animation to one at an innermost shell of the three-dimensional representation of the surface of the three-dimensional animation, and add the information to the plurality of density gradient parameters to provide the volumetric representation of the three-dimensional animation.

13. The electronic device of claim 9, wherein the plurality of instructions, when executed by the processor, configure the processor to map two-dimensional spatial coordinates of the model of the three-dimensional animation into three-dimensional spatial coordinates to provide the three-dimensional representation of the surface of the three-dimensional animation.

14. The electronic device of claim 9, wherein the information comprises information relating to an opacity of the three-dimensional interior volume, a color of the three-dimensional interior volume, an internal structure of the three-dimensional interior volume, or an apparent softness of a surface of the three-dimensional interior volume.

15. The electronic device of claim 9, wherein the texture atlas comprises a plurality of rectangular slices of the volumetric representation of the three-dimensional animation, the plurality of rectangular slices being sectional steps in the plurality of depths with respect to one another.

16. The electronic device of claim 9, wherein the plurality of instructions, when executed by the processor, configure the processor to normalize the texture atlas to a plurality of pixel positions of the volumetric display, the plurality of pixel positions including a height coordinate, a width coordinate, and a depth coordinate for each pixel position from among the plurality of pixel positions.

17. An electronic device for creating volumetric media for display on a volumetric display, the electronic device comprising:

a memory configured to store a plurality of instructions to create the volumetric media; and a processor configured to execute the plurality of instructions, the plurality of instructions, when executed by the processor, configuring the processor to:

receive a three-dimensional model dataset of a plurality of pixel positions of the volumetric display, generate a volumetric representation of a three-dimensional animation relative to the plurality of pixel positions, and sample the volumetric representation of the three-dimensional animation along a plurality of depths to form a texture atlas having a plurality of slices of the volumetric representation of the three-dimensional animation along the plurality of depths.

18. The electronic device of claim 17, wherein the plurality of instructions, when executed by the processor, configure the processor to:

convert a model of the three-dimensional animation to a three-dimensional representation of a surface of the three-dimensional animation, and add information relating to a three-dimensional interior volume enclosed within the three-dimensional representation of the surface of the three-dimensional animation to provide the volumetric representation of the three-dimensional animation.

19. The electronic device of claim 18, wherein the plurality of instructions, when executed by the processor, configure the processor to:

convert the model to the three-dimensional representation of the surface of the three-dimensional animation to provide a plurality of density gradient parameters, the plurality of density gradient parameters ranging from zero at an outermost shell of the three-dimensional representation of the surface of the three-dimensional animation to one at an innermost shell of the three-dimensional representation of the surface of the three-dimensional animation, and add the information to the plurality of density gradient parameters to provide the volumetric representation of the three-dimensional animation.

20. The electronic device of claim 17, wherein the texture atlas comprises a plurality of rectangular slices of the volumetric representation of the three-dimensional animation, the plurality of rectangular slices being sectional steps in the plurality of depths with respect to one another.

* * * * *